(12) United States Patent
Wolters

(10) Patent No.: US 12,383,445 B2
(45) Date of Patent: Aug. 12, 2025

(54) WHEEL ASSEMBLY FOR A WHEELCHAIR

(71) Applicant: Life & Mobility Development B.V., Doetinchem (NL)

(72) Inventor: Gerrit Wolters, Gorssel (NL)

(73) Assignee: Life & Mobility Development B.V., Doetinchem (NL)

( * ) Notice: Subject to any disclaimer, the term of this patent is extended or adjusted under 35 U.S.C. 154(b) by 466 days.

(21) Appl. No.: 18/098,350

(22) Filed: Jan. 18, 2023

(65) Prior Publication Data

US 2023/0225917 A1    Jul. 20, 2023

(30) Foreign Application Priority Data

Jan. 18, 2022   (NL) .................................... 2030598

(51) Int. Cl.
| | |
|---|---|
| *A61G 5/04* | (2013.01) |
| *H02K 7/102* | (2006.01) |
| *H02K 11/225* | (2016.01) |
| *H02K 21/22* | (2006.01) |
| *H02K 24/00* | (2006.01) |
| *B60B 1/00* | (2006.01) |

(52) U.S. Cl.
CPC ............. *A61G 5/041* (2013.01); *H02K 7/102* (2013.01); *H02K 11/225* (2016.01); *H02K 21/22* (2013.01); *H02K 24/00* (2013.01); *B60B 1/00* (2013.01)

(58) Field of Classification Search
CPC ................................. A61G 5/041; A61G 5/048
See application file for complete search history.

(56) References Cited

U.S. PATENT DOCUMENTS

| | | | | |
|---|---|---|---|---|
| 5,427,193 A | * | 6/1995 | Avakian ................ | B60L 3/0061 318/400.41 |
| 5,771,988 A | * | 6/1998 | Kikutani ................ | A61G 5/045 180/907 |
| 5,818,189 A | * | 10/1998 | Uchiyama ............ | A61G 5/1054 318/432 |
| 5,878,829 A | * | 3/1999 | Kanno .................. | B60L 3/0046 180/907 |

(Continued)

FOREIGN PATENT DOCUMENTS

EP           2708217 A1      3/2014

OTHER PUBLICATIONS

Dutch Search Report and Written Opinion—App No. 2030598—mailing date Sep. 13, 2022.

*Primary Examiner* — Jeffrey J Restifo
(74) *Attorney, Agent, or Firm* — Banner & Witcoff, Ltd.

(57) ABSTRACT

Wheel assembly, in particular for a wheel chair comprising. The wheel assembly includes a wheel shaft extending along a shaft axis and which is configured to be non-rotatably connectable to a frame of the wheelchair. A wheel with a wheel hub is mounted on the wheel shaft so as to be rotatable around the shaft axis. The wheel assembly is provided with a hub motor having a power input and with a rim handle connected to the wheel and being rotatable relative to the wheel over an angle. A resolver assembly of the wheel assembly comprises a wheel resolver which is configured to generate a wheel resolver signal, a rim handle resolver which is configured to generate a rim handle resolver signal, and at least one resolver assembly output for outputting the wheel resolver signal and the rim handle resolver signal.

26 Claims, 9 Drawing Sheets

(56) References Cited

U.S. PATENT DOCUMENTS

| | | | | |
|---|---|---|---|---|
| 5,927,414 A * | 7/1999 | Kan | ............... | A61G 5/048 |
| | | | | 180/907 |
| 6,059,060 A * | 5/2000 | Kanno | ............... | A61G 5/045 |
| | | | | 180/907 |
| 6,092,615 A * | 7/2000 | Pusch | ............... | A61G 5/1054 |
| | | | | 180/65.6 |
| 6,112,837 A * | 9/2000 | Kanno | ............... | A61G 5/048 |
| | | | | 73/1.09 |
| 6,155,367 A * | 12/2000 | Alber | ............... | A61G 5/1083 |
| | | | | 180/907 |
| 6,230,831 B1 * | 5/2001 | Ogata | ............... | A61G 5/048 |
| | | | | 318/60 |
| 6,302,226 B1 * | 10/2001 | Kanno | ............... | B62M 6/45 |
| | | | | 180/907 |
| 6,354,390 B1 * | 3/2002 | Uchiyama | ............... | A61G 5/1054 |
| | | | | 180/907 |
| 6,459,962 B2 * | 10/2002 | Ulrich | ............... | B62D 51/04 |
| | | | | 701/1 |
| 8,622,160 B2 * | 1/2014 | Flowers | ............... | B60L 53/00 |
| | | | | 74/491 |
| 8,960,712 B2 * | 2/2015 | Kanno | ............... | A61G 5/045 |
| | | | | 180/65.6 |
| 8,991,532 B2 * | 3/2015 | Wei | ............... | A61G 5/047 |
| | | | | 301/6.5 |
| 9,731,784 B2 * | 8/2017 | Mizuno | ............... | A61G 5/041 |
| 10,285,881 B2 * | 5/2019 | Kita | ............... | A61G 5/04 |
| 10,912,689 B2 * | 2/2021 | Hu | ............... | B60L 50/20 |
| 11,191,682 B2 * | 12/2021 | Saito | ............... | A61G 5/048 |
| 11,793,692 B2 * | 10/2023 | Saito | ............... | A61G 5/022 |
| 11,873,053 B2 * | 1/2024 | Ozaki | ............... | G05D 1/0891 |
| 12,199,537 B2 * | 1/2025 | Ozeki | ............... | A61G 5/125 |
| 12,303,439 B2 * | 5/2025 | Huang | ............... | B60K 7/0007 |
| 2010/0117631 A1 * | 5/2010 | Inoue | ............... | G01D 5/208 |
| | | | | 324/207.25 |
| 2020/0107977 A1 * | 4/2020 | Hu | ............... | A61G 5/047 |
| 2023/0225917 A1 * | 7/2023 | Wolters | ............... | A61G 5/048 |
| | | | | 301/6.5 |

* cited by examiner

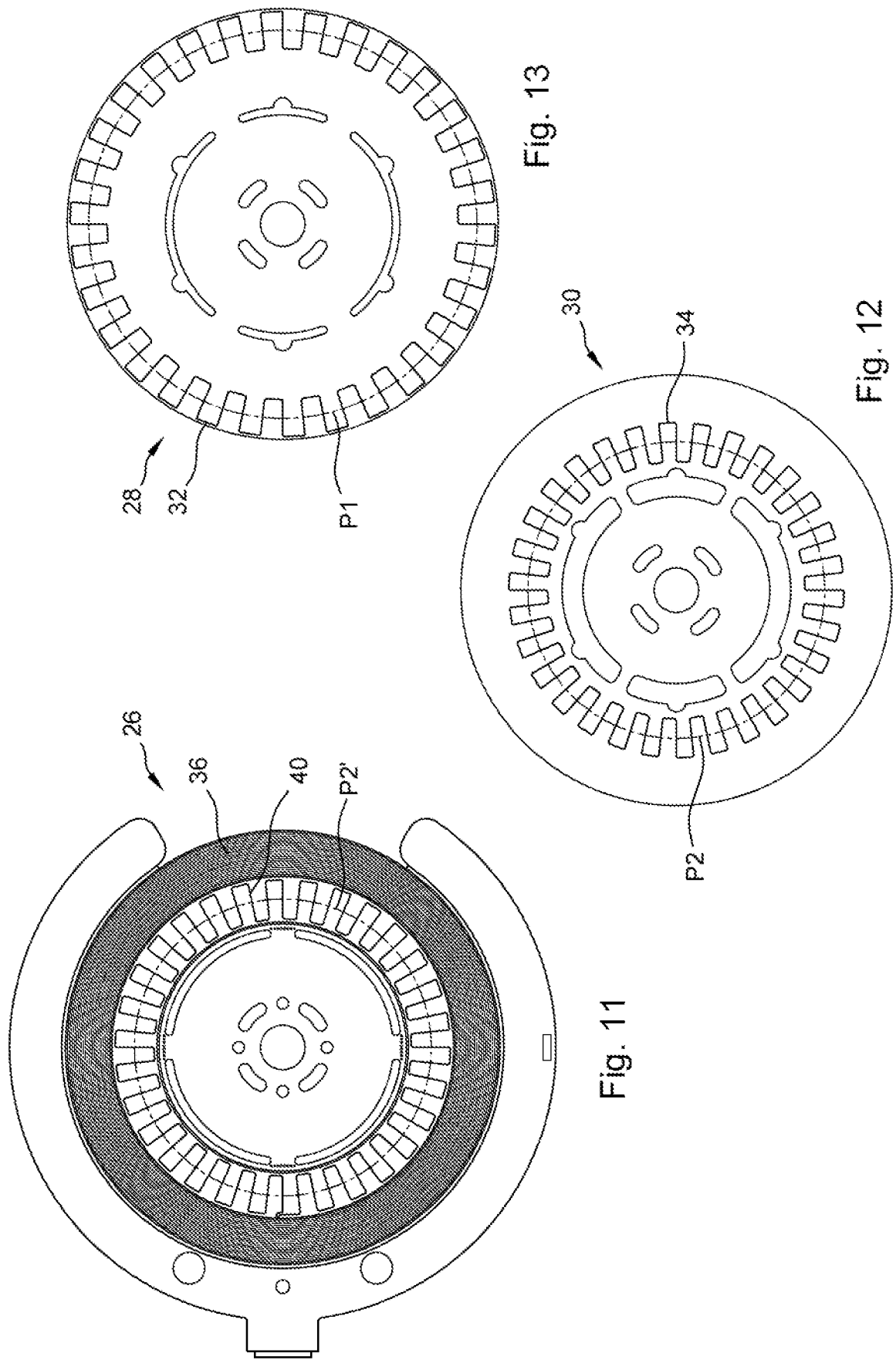

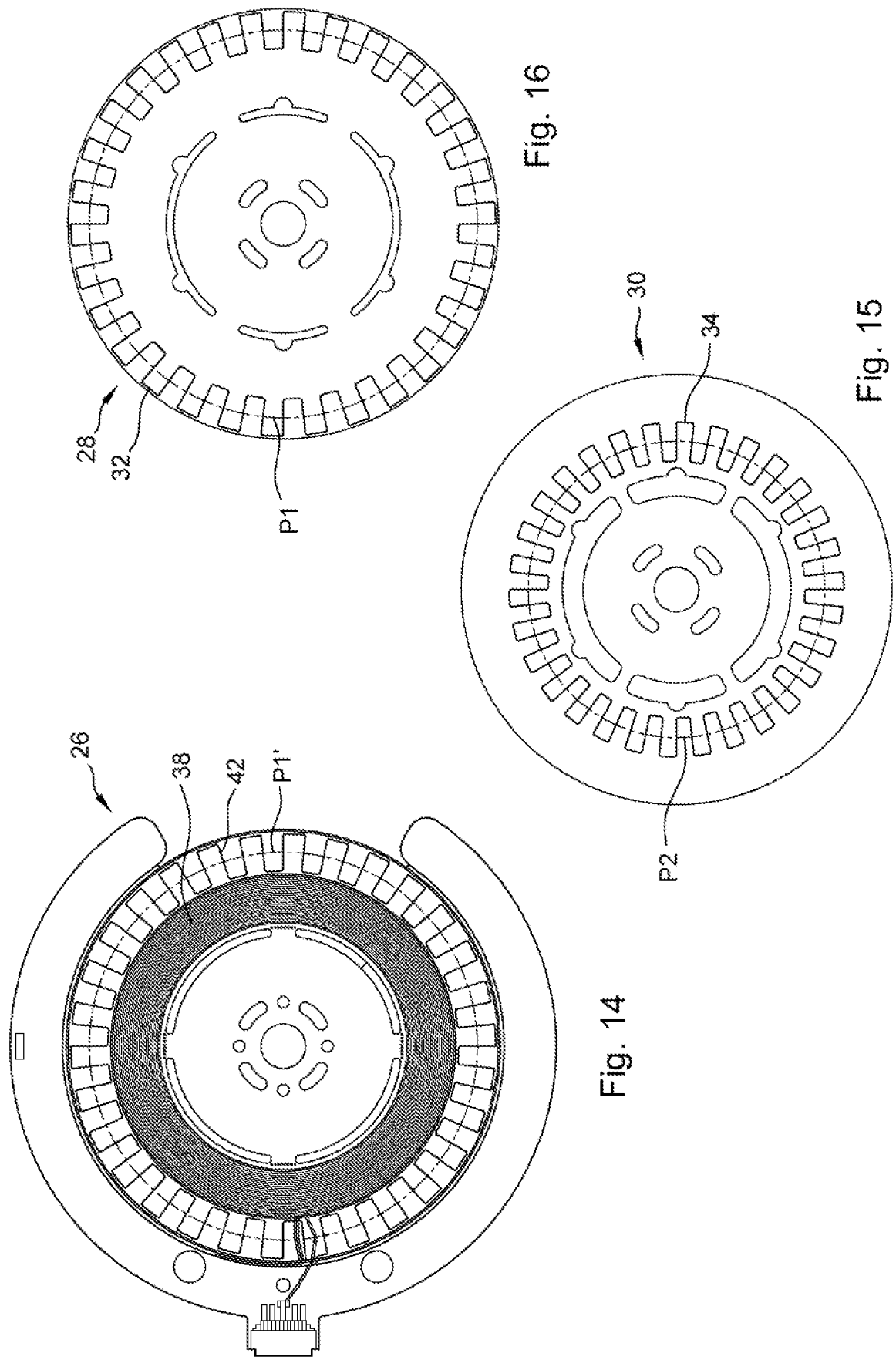

WHEEL ASSEMBLY FOR A WHEELCHAIR

CROSS-REFERENCE TO RELATED APPLICATIONS

This application claims priority under 35 U.S.C. § 119 to Application NL 2030598, filed Jan. 18, 2022, which is hereby incorporated by reference in its entirety.

FIELD

The invention relates to a wheel assembly for a wheelchair and to a wheelchair provided with such a wheel assembly.

BACKGROUND

A wheel assembly for a wheelchair is known from EP2708217A1. The known wheel assembly comprises a wheel shaft which is configured to be non-rotatably connectable to a frame of the wheelchair. A wheel including a wheel hub is mounted on the wheel shaft so as to be rotatable around the shaft axis. The known wheel assembly additionally comprises a hub motor having a power input. A rim handle is connected to the wheel and rotatable relative to the wheel over an angle.

The known wheel assembly has a rotational displacement detection mechanism configured to detect a rotational displacement of the rim relative to the wheel hub. The known rotational displacement detection mechanism comprises an annular permanent magnet and a so-called Hall element. This specific configuration is relatively expensive.

SUMMARY

The object of the present invention is to provide a wheel assembly having an alternative solution for detecting rotational displacement of the rim handle relative to the wheel which is reliable and which can be manufactured economically.

To that end, the invention provides a wheel assembly according to claim 1. More in particular, the invention provides a wheel assembly for a wheelchair, the wheel assembly comprising:
- a wheel shaft extending along a shaft axis and which is configured to be non-rotatably connectable to a frame of the wheelchair;
- a wheel with a wheel hub which is mounted on the wheel shaft so as to be rotatable around the shaft axis;
- a hub motor having a power input;
- a rim handle connected to the wheel and being rotatable relative to the wheel over an angle;
- a resolver assembly comprising:
  - a wheel resolver which is configured to generate a wheel resolver signal;
  - a rim handle resolver which is configured to generate a rim handle resolver signal;
  - at least one resolver assembly output for outputting the wheel resolver signal and the rim handle resolver signal.

Due to the fact that a resolver assembly is used, the permanent magnet and the Hall-element can be disposed of. No wiring has to be connected to rotating parts nor wipers or brush contacts have to be used. The resolver assembly can be manufactured at relatively low costs. The power source and the controller may be external from the wheel assembly and may, for example, be positioned under the seat of the wheelchair. Thus, exchangeability of the wheel assembly may be relatively easy. To that end, just the power input as well as the resolver assembly output may have to be disconnected and the wheel shaft may be disconnected from the frame of the wheelchair to disassemble the wheel assembly from the frame of the wheelchair.

The invention also provides an assembly of the wheel assembly according to the invention, wherein the assembly further comprises a variable power supply of which an output is connected to the power input of the hub motor, and wherein the assembly comprises an electronic controller having an input assembly to which the at least one resolver assembly output is connected and having an output which is connected to the variable power supply for controlling the output power of the power supply. The electronic controller is configured for processing the wheel resolver signal and the rim handle resolver signal and to generate in dependence of at least those two signals a power supply control signal.

The invention also provides a wheelchair comprising a wheel assembly according to the invention.

The wheelchair according to the invention has the same advantages as have been described above with reference to the wheel assembly.

BRIEF DESCRIPTION OF THE DRAWINGS

FIG. 11 shows a front side of the base print board;
FIG. 12 shows a front side of the rim handle print board;
FIG. 13 shows a front side of the wheel print hoard;
FIG. 14 shows a rear side of the base print board;
FIG. 15 shows a rear side of the rim handle print board;
FIG. 16 shows a rear side of the wheel print board.

DETAILED DESCRIPTION

Figure 3:
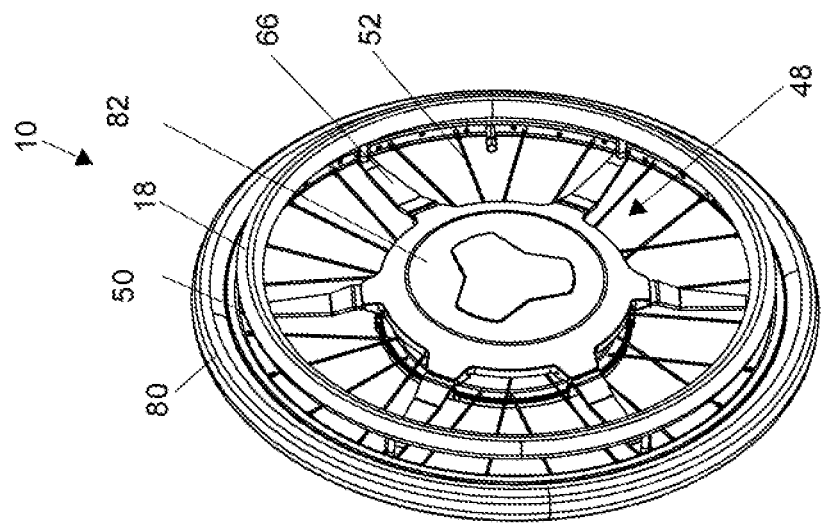
FIG. 3 shows a perspective view of the wheel assembly of FIG. 1 from a second point of view.
Figure 2:
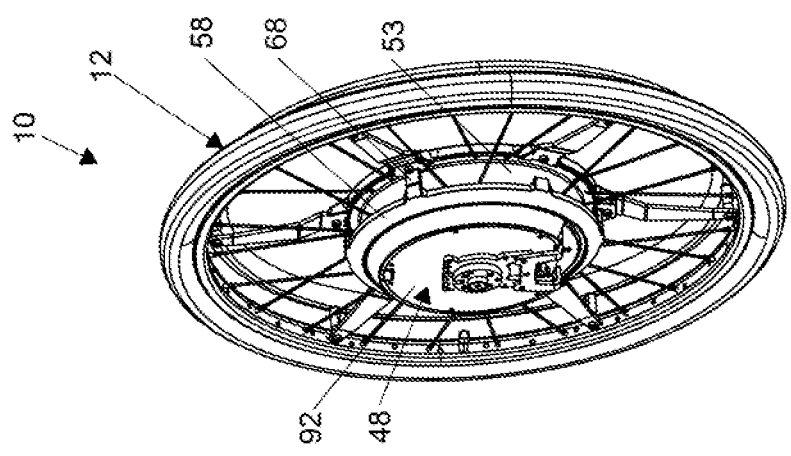
FIG. 2 shows perspective view of the wheel assembly of FIG. 1 from a first point of view.
Figure 1:
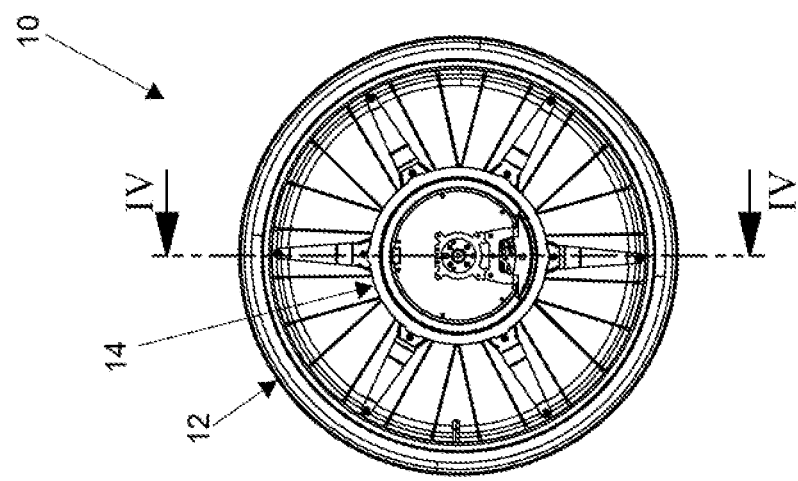
FIG. 1 shows an elevational view from an example of a wheel assembly.
Figure 5:
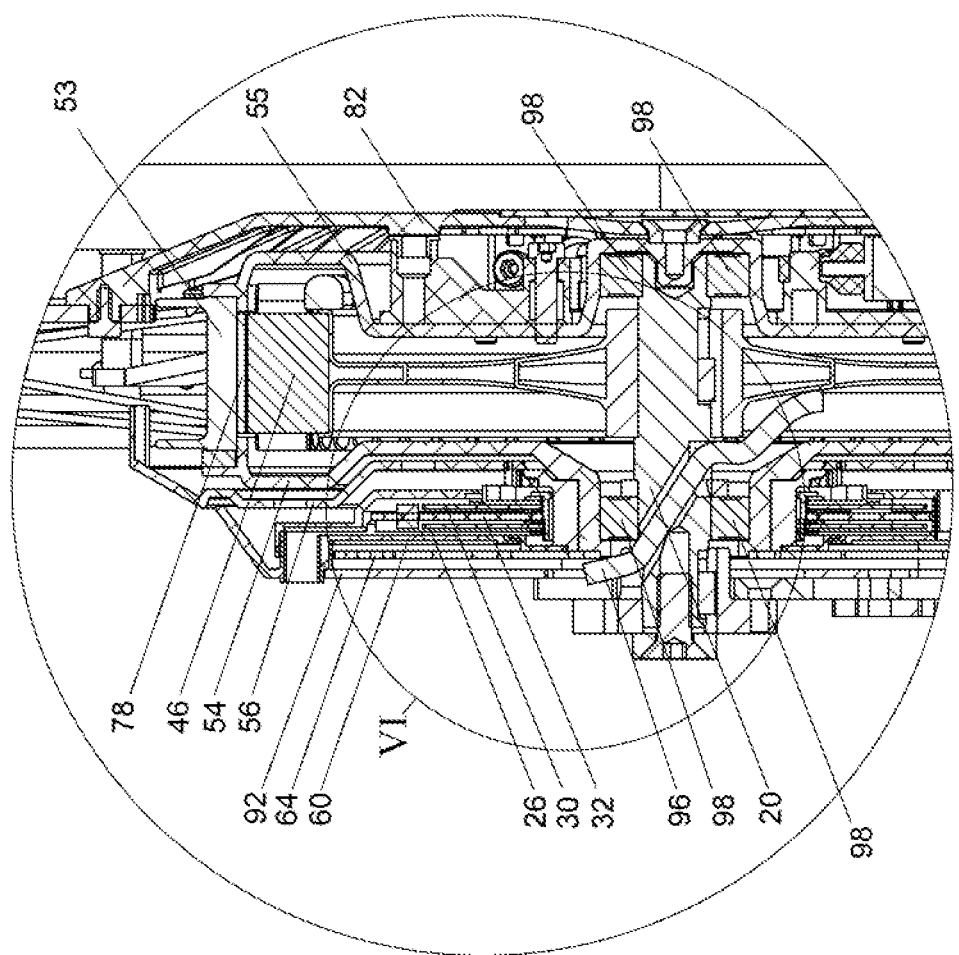
FIG. 5 shows detail V of FIG. 4.

In this application similar or corresponding features are denoted by similar or corresponding reference signs. The description of the various embodiments is not limited to the examples shown in the figures and the reference numbers used in the detailed description and the claims are not intended to limit the description of the embodiments, but are included to elucidate the embodiments.

In most general terms, the invention provides a wheel assembly 10 for a wheelchair. The wheel assembly 10 comprises a wheel shaft 20 extending along a shaft axis and which is configured to be non-rotatably connectable to a frame of the wheelchair. A wheel 12 including a wheel hub 48 is mounted on the wheel shaft 20 so as to be rotatable around the shaft axis. The wheel assembly 10 comprises a hub motor 14 having a power input. The wheel assembly 10 further has a rim handle 18 which is connected to the wheel 12 and which is rotatable relative to the wheel over an angle α. A resolver assembly 21 is provided which comprises a wheel resolver 22 which is configured to generate a wheel resolver signal S1, as well as a rim handle resolver 24 which is configured to generate a rim handle resolver signal S2. The resolver assembly 21 has a resolver assembly output 21a for outputting the wheel resolver signal S1 and the rim handle resolver signal S2.

The advantages which are described in the summary above are incorporated here by reference to what has been explained in the summary.

In an embodiment, of which an example is shown in the figures, the resolver assembly may comprise a base print board 26 which is non-rotatably connected to the wheel shaft 20, a wheel print board 28 which is non-rotatably connected to the wheel 12, and a rim handle print board 30 which is non-rotatably connected to the rim handle 18.

By virtue of the fact that the resolver assembly 21 is, in fact, formed by three printed circuit boards 26, 28, 30, the costs for manufacturing the resolver assembly 21 may be relatively low. Additionally, the accuracy of the signals S1 and S2 which may be generated by the wheel resolver 22 and the rim handle resolver 24 may be very accurate and the response time may be extremely short, in fact almost real time. Thus, any displacement of the rim handle 18 relative to the wheel 12 can be accurately and quickly monitored. As a consequence, the power assist function which may be provided by the wheel assembly may be very accurate and quick.

In an embodiment, the base print board 26 may be positioned between the wheel print board 28 and the rim handle print board 30. Thus the strength of the wheel resolver signal S1 and the rim handle resolver signal S2 may be of substantially equal strength.

In an embodiment, of which an example is shown in the figures, the base print board 26 may comprise a first base print board coil track 36 which is connectable to an electronic controller 44 and which is configured for generating a first magnetic field, wherein the windings of the first base print board coil track 36 are substantially concentric with the shaft axis.

In an embodiment, of which an example is shown in the figures, the base print board 26 may comprise a second base print board coil track 38 which is connectable to an electronic controller 44 and which is configured for generating a second magnetic field, wherein the windings of the second base print board coil track 38 are substantially concentric with the shaft axis.

In an embodiment, of which an example is shown in the figures, the wheel print board 28 may comprises a wheel print board conductive track 32 which is electrically closed and extends with a meandering pattern, e.g. a zig-zag pattern or a crenellated pattern, over a pitch circle P1 which is concentric with the shaft axis and which has a first radius, wherein the base print board 26 has at least one first base print board detection track 40, which extends with a similar meandering pattern as the wheel print board conductive track 32, e.g. a zig-zag pattern or a crenellated pattern, over a pitch circle P1' which is concentric with the shaft axis and which also has the first radius, wherein the at least one first base print board detection track 40 is connectable to an input assembly of an electronic controller 44.

In an embodiment, of which an example is shown in the figures, the rim handle print board 30 comprises a rim handle print board conductive track 34 which is electrically closed and extends with a meandering pattern, e.g. a zig-zag pattern or a crenellated pattern, over a pitch circle P2 which is concentric with the shaft axis and which has a second radius, wherein the base print board 26 has at least one second base print board detection track 42 which extends with a similar meandering pattern as the rim handle plate conductive track 34, e.g. a zig-zag pattern or a crenellated pattern, over a pitch circle P2' which is concentric with the shaft axis and which also has a second radius, wherein the at least one second base print board detection track 42 is connectable to an input assembly of an electronic controller 44.

The base print board 26, the wheel print board 28 and the rim handle print board 30 as described above may be manufactured with conventional print board manufacturing techniques and thus the costs of these respective print boards 26, 28, 30 may be relatively low.

The meandering patterns may include a plurality of similarly shaped consecutive periodic structures, e.g. one zig-zag structure or one crenellation including a top and a valley. In an embodiment, each periodic structure may extend over a pitch angle of the pitch circle which is in the range of 3°-36°. With a periodic structure which extends over the pitch angle as claimed, sufficiently accurate signals may be generated by the wheel resolver 22 and the rim handle resolver 24 to obtain real time information about the motion of the rim handle 18 relative to the wheel 12. In a practical example, the at least one first base print board detection track 40 may comprise two first base print board detection tracks 40 which may be off-set over an angle relative to each other. The same may be the case for the at least one second base print board detection track 42 which may, in a practical example, be formed by two second base print board detection tracks 42 which are angularly offset relative to each other. This may provide a more robust and reliable wheel resolver signal S1 and rim handle resolver signal S2.

In an embodiment, of which an example is shown in the figures, the hub motor 14 may comprise a stator 46 which is non-rotatably connected with the wheel shaft 20. The hub motor 14 also may comprise the wheel hub 48. The wheel hub 48 may comprise a wheel hub housing 53, a first wheel hub cover plate 54 and a second wheel hub cover plate 55 which are connected to the wheel hub housing 53 and which together bound a wheel hub chamber in which the stator 46 is accommodated. A wheel print board carrier 58 is connected to the wheel hub 48 and the wheel print board 28 is mounted on the wheel print board carrier 58.

Thus, the wheel print hoard 28 rotates along with the wheel hub 48 and the wheel 12.

In the example shown in the drawings, the wheel hub 48 also constitutes the rotor of the hub motor 14. In other words, the hub motor 14 shown in the example is of the direct drive type. The invention is not limited to wheel assemblies 10 with directly driven hub motors 14. It is also possible that a transmission, for example a planetary gear transmission is mounted between the wheel hub 48 and the rotor of the hub motor 14.

Figure 8:
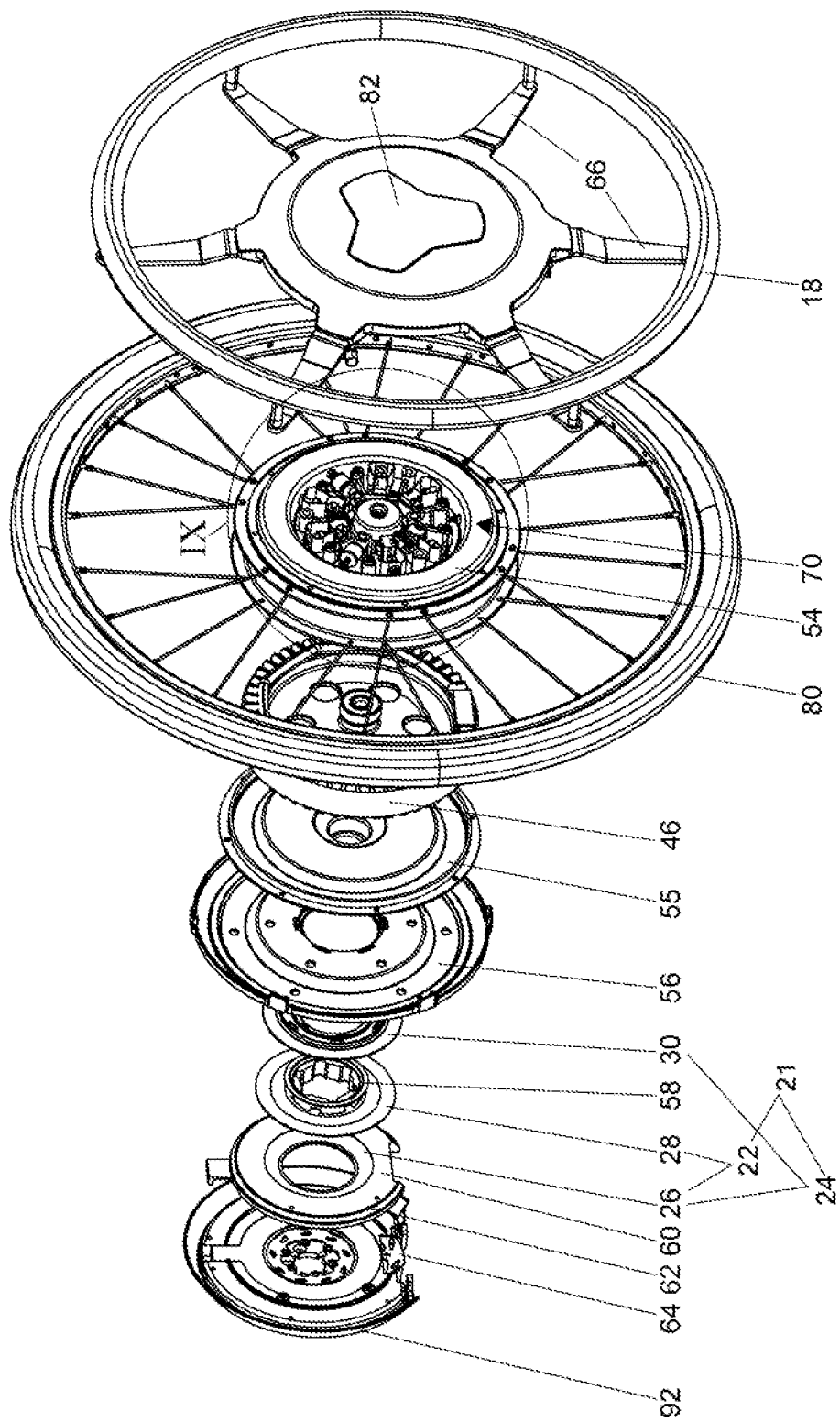
FIG. 8 shows an exploded perspective view of the wheel assembly of FIG. 3 from the second point of view.
Figure 9:
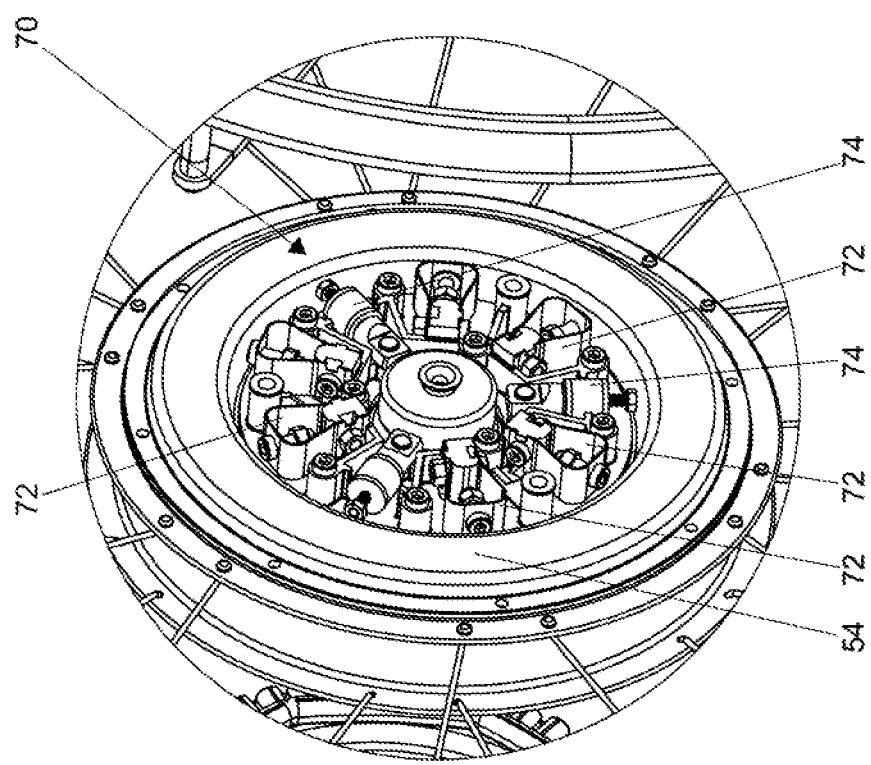
FIG. 9 shows detail IX from FIG. 8.

In an embodiment, of which an example is shown in the FIGS. 8 and 9, the wheel assembly 10 may comprise a rim handle connection assembly 70 via which the rim handle 18 is connected to the wheel hub 48 of the wheel 12.

The rim handle connection assembly 70 allows rotational motion of the rim handle 18 relative to the wheel hub 48. Preferably, the rim handle connection assembly 70 comprises rim handle connection springs 72 which bias the rim handle 18 in a neutral position relative to the wheel hub 48 and thus relative to the wheel 12. In order to prevent unwanted oscillation of the rim handle 18 relative to the wheel hub 48 and the wheel 12, rim handle connection dampers 74 may be provided as well.

Figure 7:
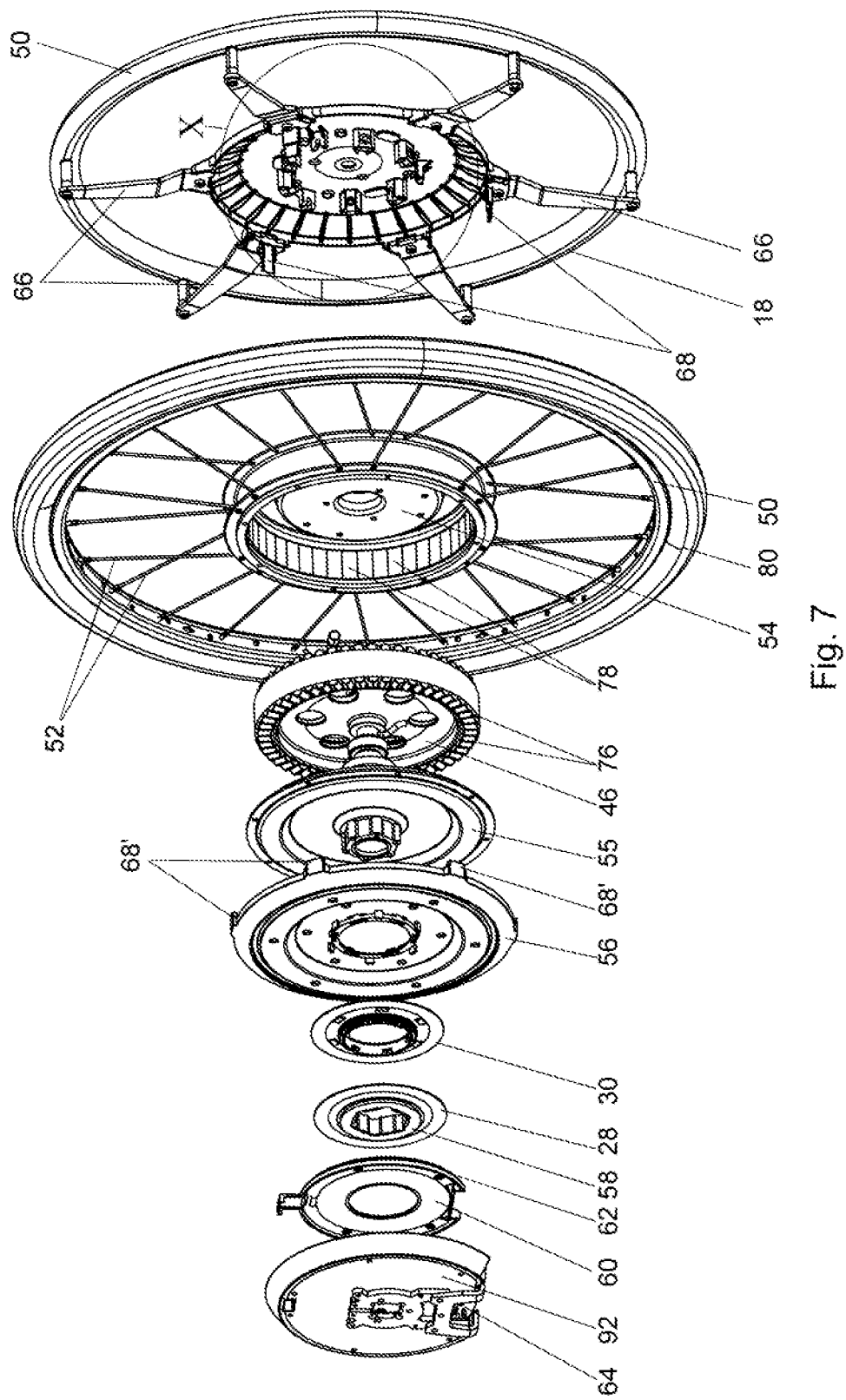
FIG. 7 shows an exploded perspective view of the wheel assembly of FIG. 2 from the first point of view.

In an embodiment, of which an example is shown in the FIGS. 3, 7 and 8, the wheel assembly 10 may comprise rim handle spokes 66 which are connected at a radial outer end with the rim handle 18. Inner radial ends of the rim handle spokes 66A may be connected to a connection assembly cover plate 82 as is visible in FIGS. 3 and 8.

As explained above, in an embodiment, the rim handle connection assembly 70 may comprise rim handle connection springs 72 via which the connection assembly cover plate 82 is connected with the wheel hub 48 as well as rim handle connection dampers 74 via which the connection assembly cover plate 82 is connected with the wheel hub 48. The rim handle connection spring 72 allow the rotation of the rim handle 18 relative to the wheel hub 48 and wheel 12 and additionally urge or bias the rim handle 18 in a neutral position relative to the wheel hub 48 and the wheel 12. The rim handle connection dampers 74 also allow the rotation of the rim handle 18 relative to the wheel hub 48 and wheel 12 and have the function of damping unwanted rotational oscillation between the rim handle 18 on the one hand and the wheel hub 48 and the wheel 12 on the other hand.

Figure 10:
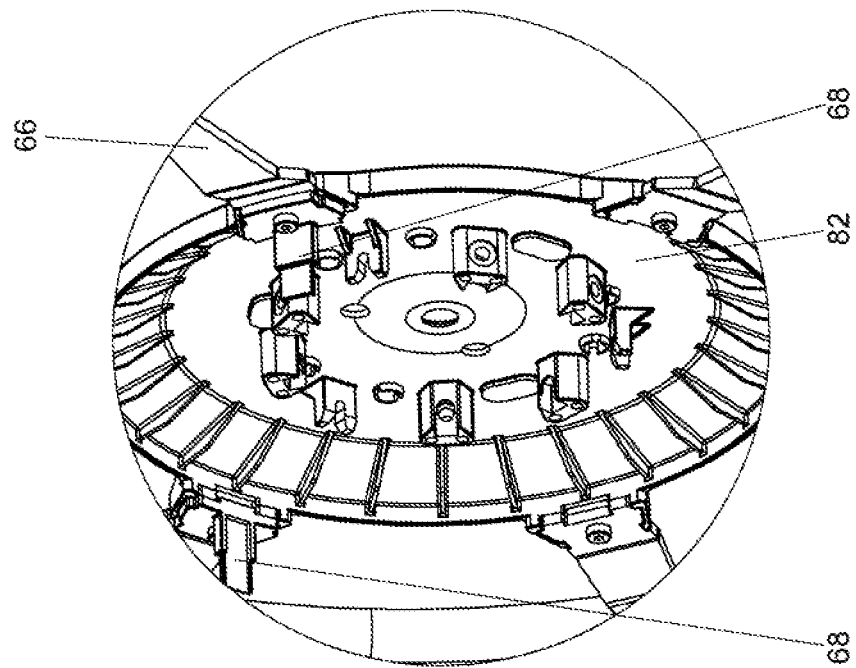
FIG. 10 shows detail X from FIG. 7.

In an embodiment, of which an example is visible in FIGS. 9 and 10, the rim handle connection spring 72 and/or the rim handle connection dampers 74 may be exchangeable for tailoring the handling characteristics of the wheel assembly 10 to needs of a type of user. Thus, by exchanging the springs 72 and/or the dampers 74, for example, the force which is needed to angularly move the rim handle 18 relative to the wheel hub 48 may be varied and tailored to the force of a type of user.

The embodiment of the connection assembly 70 described above provides a stable connection between the rim handle 18 and the wheel hub 48 which substantially only allows rotation of the rim handle 18 relative to the wheel hub 48 over a limited angle and which additionally prevents unwanted rotational oscillation of the rim handle 18 relative to the wheel hub 48. Further, a high stability of the rim handle 18 relative to the wheel 12 is obtained with this connection assembly which substantially prevents movement of the rim handle 18 relative to the wheel 12 apart from the above described relative rotation over a limited rotation angle.

In an embodiment, the rim handle spokes 66 or the connection assembly cover plate 82 may be provided with rim handle connection struts 68 which extend from a rim handle side of the wheel 12 to an opposite, resolver assembly side of the wheel 12. An example of rim handle connection struts 68 is visible in FIGS. 7 and 10. A rim handle print board carrier 56 positioned at the resolver assembly side of the wheel 12 is connected to the rim handle connection struts 68. In FIG. 7 strut parts 68' are indicated which are connectable to the struts 68 which may be, as shown in the example of FIG. 7, connected to the rim handle spokes 66 or the connection assembly cover plate 82. In this embodiment, the rim handle print board 30 is mounted on the rim handle print board carrier 56.

In an embodiment, of which an example is shown in the figures, the wheel assembly 10 may comprise a base print board carrier 60 (see FIGS. 5-8) which is rotatably fixed relative to the wheel shaft 20 and on which the base print board 26 is mounted.

In an embodiment, of which an example is shown in the figures, the wheel assembly 10 may comprise a resolver assembly cover plate 62 (see FIGS. 7 and 8) which is releasably connected to the wheel shaft 20 and to which the base print board carrier 60 may be releasably connected.

The wheel assembly 10 may comprise a brake disk 64 which is releasably connected to the wheel hub 48, in particular to the hub cover plate 54. Please refer to FIGS. 6, 7 and 8. The brake disk 64 may mounted at a side of the resolver assembly cover plate 62 which is opposite the resolver assembly 21. A brake disk cover plate 92 is mounted on the resolver assembly cover plate 62 so as to form a brake disk chamber 94.

The wheel assembly 10 may comprise a wheel rim 50, a tire 80 mounted on the wheel rim 50, and a plurality of spokes 52 which connect the wheel rim 50 with the wheel hub 48.

In an embodiment, of which an example is in FIG. 7, the stator 46 of the wheel assembly may comprise a plurality of hub motor coils 76. The wheel hub 48 may comprise a plurality of permanent hub motor magnets 78.

Figure 4:
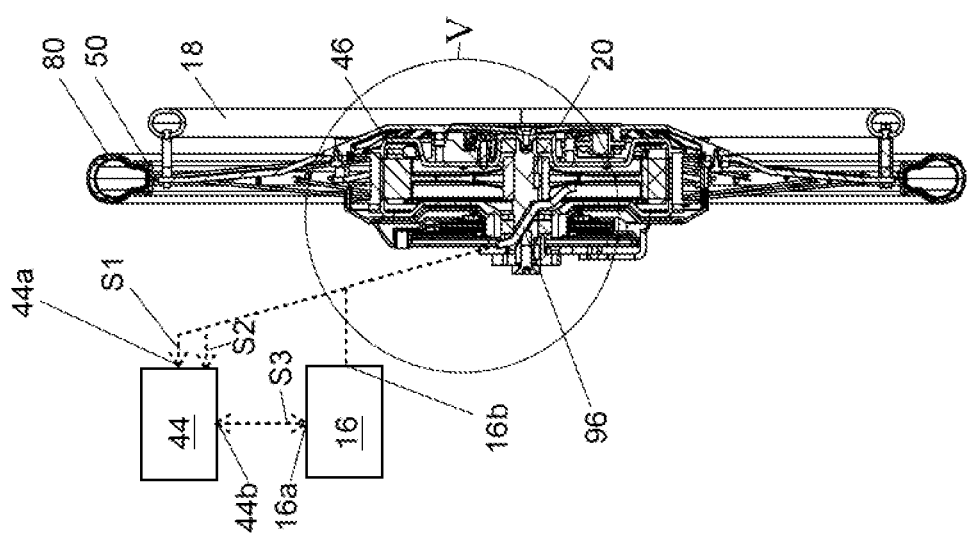
FIG. 4 shows a cross-section over line IV-IV in FIG. 1.
Figure 6:
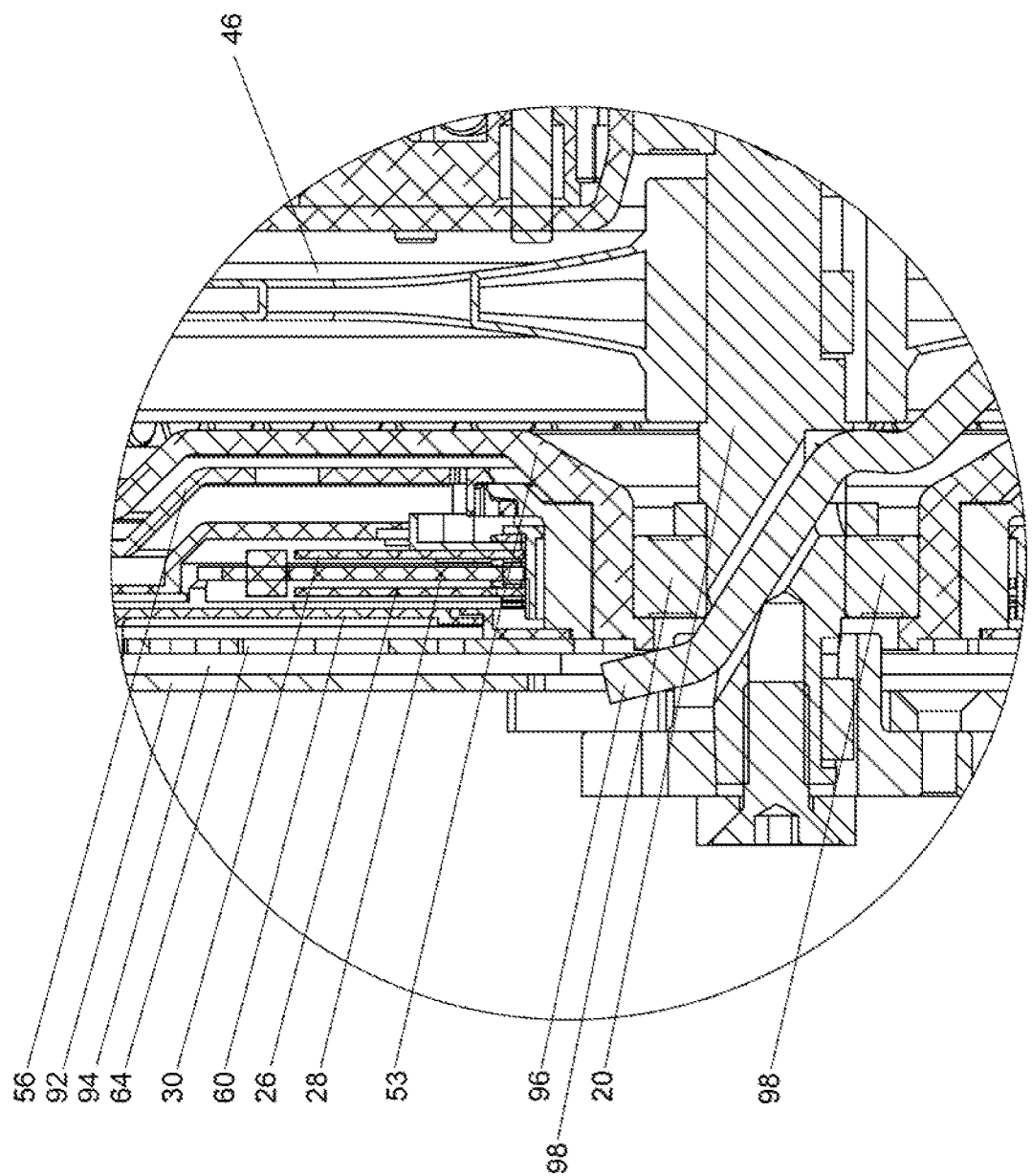
FIG. 6 shows detail VI of FIG. 5.

In an embodiment, of which an example is shown in the FIG. 4, the wheel assembly 10 may further comprise a variable power supply 16 of which an output 16b is connected to the power input of the hub motor 14. The wheel assembly 10 may additionally comprise an electronic controller 44 having an input assembly 44a to which the at least one resolver assembly output 21a is connected and having an output 44b which is connected to an input assembly 16b of the variable power supply 16 for controlling the output power of the power supply 16. The electronic controller 44 is configured for processing the wheel resolver signal S1 and the rim handle resolver signal S2 and to generate in dependence of at least those two signals S1, S2 a power supply control signal S3.

The variable power supply 16 and the electronic controller 44 may be mounted in the wheelchair, and be connected to the frame of the wheelchair. However, it is not excluded that the power supply and the electronic controller are directly connected to e.g. the wheel shaft 20 so that with removal of the wheel assembly 10, also the power supply 16 and the electronic controller 44 are removed from the wheelchair.

In a further elaboration of the previous embodiment, the power supply control signal S3 has a positive substantially linear relation with the power supplied by the variable power supply 16 to the hub motor 14.

In other words, the higher the control signal S3, the higher the power supplied by the variable power supply 10 to the hub motor 14.

In a further elaboration of the previous embodiment, wherein the power supply control signal S3 is dependent on the average difference between wheel resolver signal S1 and the handle resolver signal S2 during a number of sampling periods.

A sampling period may e.g. be in the range of 0.001 to 0.2 s. The number n of sampling periods may e.g. be 10. For example, when the sampling period is 0.01 s and the number of sampling periods is 10, then the ten signal difference values S2–S1 measured at subsequent periods i (i being 1 to 10), i.e. 10 signal differences which are measured in a total time span of 0.1 s are added and divided by n, i.e. in this example by 10. For n measurements of signal differences S2–S1, the average signal difference is defined by the following formula:

$$\text{average signal difference} = \frac{\sum_{i=1}^{n} (S2 - S1)_i}{n}$$

By using an average signal difference, the variation in power supply to the hub motor 14 may be smoothened and not be immediately dependent on each signal difference S2–S1 which is measured. This may improve the perception of the user who is exerting a force on the rim handle 18. It should be noted that the electronic controller 44 may include many more algorithms to further improve the power assist perception of the user. For example, algorithms may be used to evaluate both the signals S1 and S2 of the right wheel assembly 10 as well as the signal S1' and S2' of the left wheel assembly 10' of a wheelchair and in dependence of this evaluation generate signals S3, S3' which take into account the results of the evaluation.

In a further embodiment, the electronic controller 44 may supply an alternating current to the first base print coil track 36 to generate the first magnetic field. This first magnetic field, in turn, generates an alternating current in the wheel print board conductive track 32, which in turn, generates a series of third magnetic fields around the meandering pattern of the wheel print board conductive track 32. This series of third magnetic fields, in turn, generates an alternating current in the at least one first base print board detection track 40 which is the wheel resolver signal S1.

The electronic controller 44 may additionally supply an alternating current to the second base print coil track 38 to generate the second magnetic field. This second magnetic field, in turn generates an alternating current in the rim handle print board conductive track 34, which, in turn, generates a series of forth magnetic fields around the meandering pattern of the rim handle print board conductive track 32. This series of fourth magnetic fields, in turn, generates an alternating current in the at least one second base print board detection track 42 which is the rim handle resolver signal S2.

In the above described embodiment, the base print board has two coil tracks 36 and 38, wherein the first base print coil track 36 provides the power for generating the first resolver signal S1 and wherein the second base print coil track 38 provides the power for generating the second resolver signal S2.

In an alternative embodiment, it is also feasible that the base print board 30 only has a single base print coil track 36. In such an embodiment, the electronic controller 44 may supply an alternating current to the first base print coil track 36 to generate the first magnetic field, which in turn generates an alternating current in the wheel print board conductive track 32, which in turn generates a series of third magnetic fields around the meandering pattern of the wheel print board conductive track 32. This series of third magnetic fields, in turn, generates an alternating current in the at least one first base print board detection track 40 which is the wheel resolver signal S1. The first magnetic field additionally generates an alternating current in the rim handle print board conductive track 34, which in turn generates a series of fourth magnetic fields around the meandering pattern of the rim handle print board conductive track 32. This series of fourth magnetic fields, in turn, generates an alternating current in the at least one second base print board detection track 42 which is the rim handle resolver signal S2.

Figure 17:
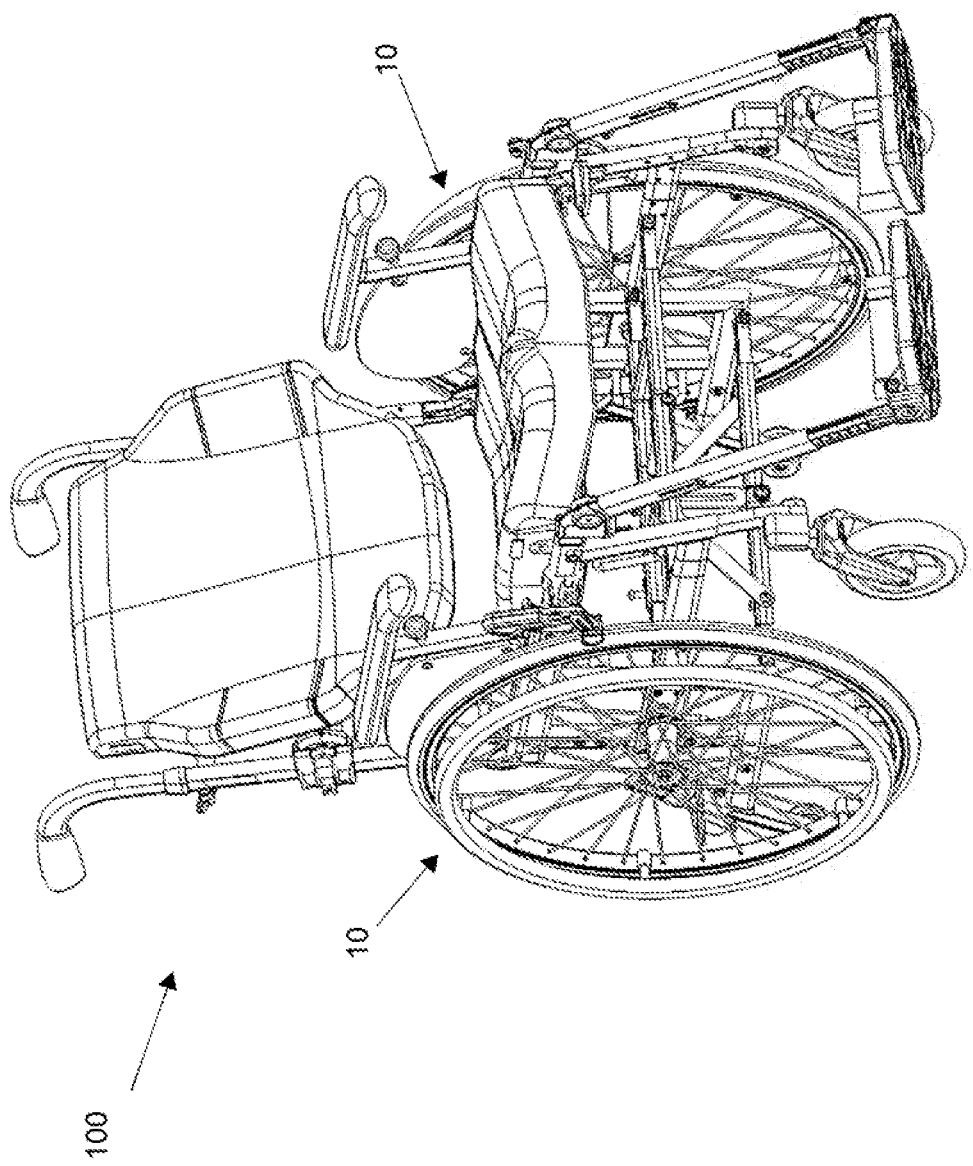
FIG. 17 shows a wheelchair with two wheel assemblies.

FIG. 17 shows an example of a wheel chair being provide with two wheel assemblies 10.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this description are not necessarily all referring to the same embodiment.

Furthermore, it is noted that particular features, structures, or characteristics of one or more of the various embodiments which are described above may be used implemented independently from one another and may be combined in any suitable manner to form new, not explicitly described embodiments. The reference numbers used in the detailed description and the claims do not hunt the description of the embodiments, nor do they limit the claims. The reference numbers are solely used to clarify.

LIST OF ELEMENTS 10. wheel assembly
12. wheel
14. hub motor
16. variable power supply
18. rim handle
20. wheel shaft
21. resolver assembly
22. wheel resolver
24. rim handle resolver
26. base print board
28. wheel print board
30. rim handle print board
32. wheel print hoard conductive track
34. rim handle print board conductive track
36. first base print board coil track
38. second base print board coil track
40. first base print board detection track
42. second base print board detection track
44. electronic controller
46. stator
48. wheel hub
50. wheel rim
52. spokes
53. wheel hub housing
54. first wheel hub cover plate
55. second wheel hub cover plate
56. rim handle print board carrier
58. wheel print hoard carrier
60. base print board carrier
62. resolver assembly cover plate
64. brake disk
66. rim handle spokes
68. rim handle connection struts
68'. rim handle connection struts
70. rim handle connection assembly
72. rim handle connection springs
74. rim handle connection dampers
76. hub motor coils
78. hub motor magnets
80. tire
82. connection assembly cover plate
92. brake disk cover plate
94. brake disk chamber
96. cable assembly 98. bearings
P1. pitch circle on wheel print board 28
P2. pitch circle on rim handle print board 30
P1'. pitch circle on base print board 26
P2'. pitch circle on base print board 26
S1. Wheel resolver signal
S2. Rim handle resolver signal
S3. Power supply control signal
100. Wheel chair

The invention claimed is:

1. A wheel assembly for a wheelchair, the wheel assembly comprising:
    a wheel shaft extending along a shaft axis and which is configured to be non-rotatably connectable to a frame of the wheelchair;
    a wheel including a wheel hub, the wheel being mounted on the wheel shaft so as to be rotatable around the shaft axis;
    a hub motor having a power input;
    a rim handle connected to the wheel and being rotatable relative to the wheel over an angle ($\alpha$);
    a resolver assembly comprising:
        a wheel resolver which is configured to generate a wheel resolver signal;
        a rim handle resolver which is configured to generate a rim handle resolver signal;
        at least one resolver assembly output for outputting the wheel resolver signal and the rim handle resolver signal.

2. The wheel assembly according to claim 1, wherein the resolver assembly comprises:
    a base print board which is non-rotatably connected to the wheel shaft;
    a wheel print board which is non-rotatably connected to the wheel; and
    a rim handle print board, which is non-rotatably connected to the rim handle.

3. The wheel assembly according to claim 2, wherein the base print board is positioned between the wheel print board and the rim handle print board.

4. The wheel assembly according to claim 2, wherein the base print board comprises a first base print board coil track which is connectable to an electronic controller and which is configured for generating a first magnetic field, wherein the windings of the first base print board coil track are substantially concentric with the shaft axis.

5. The wheel assembly according to claim 4, wherein the base print board comprises a second base print board coil track which is connectable to an electronic controller and which is configured for generating a second magnetic field, wherein the windings of the second base print board coil track are substantially concentric with the shaft axis.

6. The wheel assembly according to claim 2, wherein the wheel print board comprises a wheel print board conductive track which is electrically closed and extends with a meandering pattern over a pitch circle which is concentric with the shaft axis and which has a first radius, wherein the base print board has at least one first base print board detection track which extends with a similar meandering pattern as the wheel print board conductive track over a pitch circle which is concentric with the shaft axis and which also has the first radius, wherein the at least one first base print board detection track is connectable to an input assembly of an electronic controller.

7. The wheel assembly according to claim 6, wherein the meandering pattern includes a plurality of similarly shaped consecutive periodic structures, wherein each periodic structure extends over a pitch angle of the pitch circle which is in the range of 3°-36°.

8. The wheel assembly according to claim 2, wherein the rim handle print board comprises a rim handle print board conductive track which is electrically closed and extends with a meandering pattern over a pitch circle which is concentric with the shaft axis and which has a second radius, wherein the base print board has at least one second base print board detection track which extends with a similar meandering pattern as the rim handle plate conductive track over a pitch circle which is concentric with the shaft axis and which also has a second radius, wherein the at least one second base print board detection track is connectable to an input assembly of an electronic controller.

9. The wheel assembly according to claim 2, wherein the hub motor comprises:
    a stator which is non-rotatably connected with the wheel shaft and
    the wheel hub,
    the wheel hub comprising a wheel hub housing, a first wheel hub cover plate and a second wheel hub cover plate which are connected to the wheel hub housing and which together bound a wheel hub chamber in which the stator, is accommodated, wherein a wheel print board carrier is connected to the wheel hub, wherein the wheel print board is mounted on the wheel print board carrier.

10. The wheel assembly according to claim 9, wherein the stator comprises a plurality of hub motor coils, and wherein the wheel hub comprises a plurality of permanent hub motor magnets.

11. The wheel assembly according to claim 2, comprising:
    a base print board carrier which is rotatably fixed relative to the wheel shaft and on which the base print board is mounted.

12. The wheel assembly according to claim 11, comprising:
    a resolver assembly cover plate which is releasably connected to the wheel shaft and to which the base print board carrier is releasably connected.

13. The wheel assembly according to claim 1, comprising:
    a rim handle connection assembly, via which the rim handle is connected to the wheel hub of the wheel.

14. The wheel assembly according to claim 13, comprising:
    rim handle spokes which are connected at a radial outer end with the rim handle;
    a connection assembly cover plate to which are connected inner radial ends of the rim handle spokes;
    wherein the rim handle connection assembly comprises:
    rim handle connection springs via which the connection assembly cover plate is connected with the wheel hub;
    rim handle connection dampers via which the connection assembly cover plate is connected with the wheel hub.

15. The wheel assembly according to claim 14, wherein the rim handle connection spring and/or the rim handle connection dampers are exchangeable for tailoring the handling characteristics of the wheel assembly to needs of the user.

16. The wheel assembly according to claim 14, wherein the resolver assembly comprises,
    a base print board which is non-rotatably connected to the wheel shaft,
    a wheel print board which is non-rotatably connected to the wheel; and a rim handle print board which is non-rotatably connected to the rim handle, and wherein the rim handle spokes or the connection assembly cover plate is provided with rim handle connection struts extend from a rim handle side of the wheel to an opposite, resolver assembly side of the wheel, wherein a rim handle print board carrier positioned at the resolver assembly side of the wheel is connected to the rim handle connection struts, wherein the rim handle print board is mounted on the rim handle print board carrier.

17. The wheel assembly according to claim 1, comprising:
a brake disk which is releasably connected to the wheel hub, in particular to the hub cover plate.

18. The wheel assembly according to claim 17, wherein the resolver assembly comprises:
a base print board which is non-rotatably connected to the wheel shaft;
a wheel print board which is non-rotatably connected to the wheel; and
a rim handle print board which is non-rotatably connected to the handle,
a base print board ca tier which is rotatably fixed relative to the wheel shaft and on which the base print board is mounted, and
a resolver assembly cover plate which is releasably connected to the wheel shaft and to which the base print board carrier is releasably connected,
wherein the brake disk is mounted at a side of the resolver assembly cover plate which is opposite the resolver assembly, wherein a brake disk cover plate is mounted on the resolver assembly cover plate so as to form a brake disk chamber.

19. The wheel assembly according to claim 1, comprising:
a wheel rim;
a tire mounted on the wheel rim;
a plurality of spokes which connect the wheel rim with the wheel hub.

20. The wheel assembly according to claim 1, further comprising:
a variable power supply of which an output is connected to the power input of the hub motor; and
an electronic controller having an input assembly to which the at least one resolver assembly output is connected and having an output which is connected to an input assembly of the variable power supply for controlling the output power of the power supply, wherein the electronic controller is configured for processing the wheel resolver signal and the rim handle resolver signal and to generate in dependence of at least those two signals a power supply control signal.

21. The wheel assembly according to claim 20, wherein the power supply control signal has a positive substantially linear relation with the power supplied by the variable power supply to the hub motor.

22. The wheel assembly according to claim 21, wherein the power supply control signal is dependent on the average difference between wheel resolver signal and the handle resolver signal during a number of sampling periods.

23. The wheel assembly according to claim 20,
wherein the resolver assembly comprises:
a base print board which is non-rotatably connected to the wheel shaft;
a wheel print board which is non-rotatably connected to the wheel; and
a rim handle print board which is non-rotatably connected to the rim handle, wherein the base print board comprises a first base print board coil track which is connectable to an electronic controller and which is configured for generating a first magnetic field, wherein the windings of the first base print board coil track are substantially concentric with the shaft axis, wherein the base print board comprises a second se print board coil track which is connectable to an electronic controller and which is configured for generating a second magnetic field, wherein the windings of the second base print board coil track are substantially concentric with the shaft axis, wherein the wheel print board comprises a wheel print board conductive track which is electrically closed and extends with a meandering pattern over a pitch circle (P1) which is concentric with the shaft axis and which has a first radius, wherein the base print board has at least one first base print board detection track which extends with a similar meandering pattern as the wheel print board conductive track over a pitch circle (P1') which is concentric with the shaft axis and which also has the first radius, wherein the at least one first base print board detection track is connectable to an input assembly of an electronic controller, and wherein the electronic controller supplies an alternating current to the first base print coil track to generate the first magnetic field, which in turn generates an alternating current in the wheel print board conductive track, which in turn generates a series of third magnetic fields around the meandering pattern of the wheel print board conductive track, which, in turn, generates an alternating current in the at least one first base print board detection track which is the wheel resolver signal.

24. The wheel assembly according to claim 20,
wherein the resolver assembly comprises:
a base print board which is non-rotatably connected to the wheel shaft;
a wheel print board which is non-rotatably connected to the wheel; and
a rim handle print board which is non-rotatably connected to the rim handle, wherein the base print board comprises a first base print board coil track which is connectable to an electronic controller and which is configured for generating a first magnetic field, wherein the windings of the first base print board coil track are substantially concentric with the shaft axis, wherein the base print board comprises a second base print board coil track which is connectable to an electronic controller and which is configured for generating a second magnetic field, wherein the windings of the second base print board coil track are substantially concentric with the shaft axis, wherein the rim handle print board comprises a rim handle print board conductive track which is electrically closed and extends with a meandering pattern over a pitch circle (P2) which is concentric with the shaft axis and which has a second radius, wherein the base print board has at least one second base print board detection track which extends with a similar meandering pattern as the rim handle plate conductive track over a pitch circle (P2') which is concentric with the shaft axis and which also has a second radius, wherein at least one second base print board detection track is connectable to an input assembly of an electronic controller, and wherein the electronic controller supplies an alternating current to the second base print coil track to generate the second magnetic field, which in turn generates an alternating current in the rim handle print board conductive track, which in turn generates a series of fourth magnetic fields around the meandering pattern of the rim handle print board conductive track, which, in turn, generates an alternating current in the at least one second base print board detection track which is the rim handle resolver signal.

25. The wheel assembly according to claim 20,
wherein the resolver assembly comprises:
 a base print board which is non-rotatably connected wheel shaft;
 a wheel print board which is non-rotatably connected to the wheel; and
 a rim handle print board which is non-rotatably connected to the rim handle,
wherein the base print board comprises a first base print board coil track which is connectable to an electronic controller and which is configured for generating a first magnetic field, wherein the windings of the first base print board coil track are substantially concentric with the shaft axis,
wherein the base print board comprises a second base print board coil track which is connectable to an electronic controller and which is configured for generating a second magnetic field, wherein the windings of the second base print board coil track are substantially concentric with the shaft axis,
wherein the wheel print board comprises a wheel print board conductive track which is electrically closed and extends with a meandering pattern over a pitch circle (P1) which is concentric with the shaft axis and which has a first radius, wherein the base print board has at least one first base print board detection track which extends with a similar meandering pattern as the wheel print board conductive track over a pitch circle (P1') which is concentric with the shaft axis and which also has the first radius, wherein the at least one first base print board detection track is connectable to an input assembly of an electronic controller,
wherein the rim handle print board comprises a rim handle print board conductive track which is electrically closed and extends with a meandering pattern over a pitch circle (P2) which is concentric with the shaft axis and which has a second radius, wherein the base print board has at least one second base print board detection track which extends with a similar meandering pattern as the rim handle plate conductive track over a pitch circle (P2") which is concentric with the shaft axis and which also has a second radius, wherein the at least one second base print board detection track is connectable to an input assembly of an electronic controller, and
wherein the electronic controller supplies an alternating current to the first base print coil track to generate the first magnetic field, which in turn generates an alternating current in the wheel print board conductive track, which in turn generates a series of third magnetic fields around the meandering pattern of the wheel print board conductive track, which, in turn, generates an alternating current in the at least one first base print board detection track which is the wheel resolver signal, wherein the first magnetic field additionally generates an alternating current in the rim handle print board conductive track, which in turn generates a series of fourth magnetic fields around the meandering pattern of the rim handle print board conductive track, which, in turn, generates an alternating current in the at least one second base print board detection track which is the rim handle resolver signal.

26. A wheelchair comprising the wheel assembly according to claim 1.

* * * * *